(No Model.)

G. BOTKIN.
CUCUMBER PICKER.

No. 546,913. Patented Sept. 24, 1895.

Witnesses
Inventor
George Botkin,
By Alexander Davis
Attorneys

UNITED STATES PATENT OFFICE.

GEORGE BOTKIN, OF CHAMBERSBURG, MISSOURI.

CUCUMBER-PICKER.

SPECIFICATION forming part of Letters Patent No. 546,913, dated September 24, 1895.

Application filed June 17, 1895. Serial No. 553,070. (No model.)

*To all whom it may concern:*

Be it known that I, GEORGE BOTKIN, a citizen of the United States, residing at Chambersburg, in the county of Clark and State of Missouri, have invented certain new and useful Improvements in Cucumber-Pickers, of which the following is a specification, reference being had therein to the accompanying drawings.

My invention is an improved device for picking cucumbers from the vines; and it consists in certain novel features hereinafter described and claimed.

Figure 1:
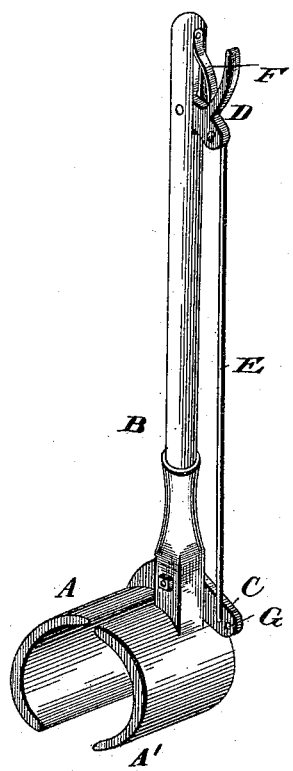
Figure 2:
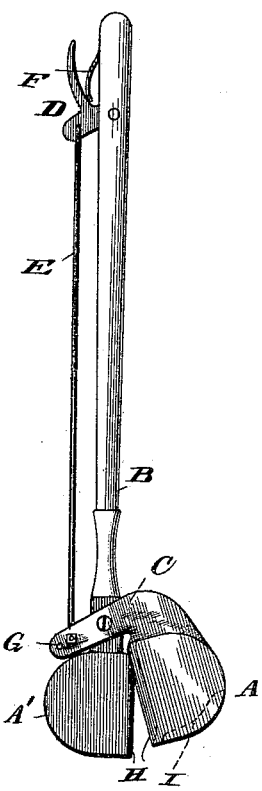
Figure 3:
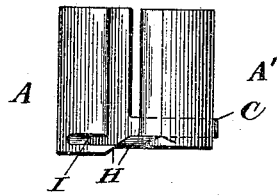

In the accompanying drawings, which fully illustrate my invention, Figure 1 is a perspective view of the device. Fig. 2 is a rear or side elevation of the same, and Fig. 3 is a detail view of the jaws which hold the cucumber.

In carrying out my invention, I employ two jaws A A', which are constructed in the form of semicylindrical boxes, so that when they are brought together they will form a complete cylindrical casing to inclose and hold the cucumber. A long handle B rises from one of the jaws, and the opposing jaw is provided with a lateral arm C, which extends transversely past the said handle and is pivoted thereto near its lower end, so as to connect the two jaws. On the side of the handle, near the upper extremity thereof, a bell-crank lever D is fulcrumed, the outer arm of said lever being connected with the arm C by a link E and its upper arm being pressed normally outward by a spring F, which is secured to the handle and bears against the inner face of said arm, as clearly shown. The swing or play of the jaw may be changed by engaging the lower end of the link in different ones of the perforations G in the arm C, as will be readily understood. The jaws are provided at one end with the knives or cutting-blades H, which have a shearing action on each other to sever the vine when the jaws are operated, and one of the jaws is provided with a notch I adjacent to its blade to receive the opposing blade and permit a full stroke of the same, as will be readily understood.

The construction of the device being thus made known, the operation of the same will be readily understood and appreciated. The jaws are opened or parted by suitably manipulating the bell-crank lever, and are then passed over the cucumber with the knives passing on opposite sides of the vine. The bell-crank lever is then pressed toward the handle, thereby closing the knives over the vine, so as to sever the same, and closing the jaws around the cucumber, so as to receive and hold the same. The cucumber may then be deposited in a basket or other receptacle.

My device is obviously of a very cheap and simple construction and can be manipulated by any person, however unskilled. The cucumbers may be gathered rapidly and easily and are not bruised in handling. The fatigue and labor now incident to gathering the cucumbers by hand are entirely overcome and obviated.

Having thus described my invention, what I claim, and desire to secure by Letters Patent, is—

1. A device for gathering cucumbers consisting essentially of a pair of semi-cylindrical jaws adapted to swing to and away from each other, and provided with cutting blades at one end.

2. A device for gathering cucumbers consisting of a pair of semi-cylindrical jaws, means for moving said jaws toward and away from each other, and knives at one end of the jaws, one of the jaws being provided with a notch to receive the opposing knife.

3. The combination of two semi-cylindrical jaws, a handle rising from one of the jaws, a lateral arm projecting from the opposing jaw and pivoted to the handle, knives at one end of the jaws, a bell crank lever mounted on the handle near the upper end thereof, and a link connecting the said lever with the lateral arm projecting from one of the jaws.

In testimony whereof I affix my signature in presence of two witnesses.

GEORGE $\overset{\text{his}}{\times}$ BOTKIN.
mark

Witnesses:
FANNIE CONWAY,
EMMA MORGAN.